July 15, 1941.
L. E. FLORY ET AL
2,248,977
ELECTRO-OPTICAL DEVICE
Filed Aug. 29, 1935
2 Sheets-Sheet 1
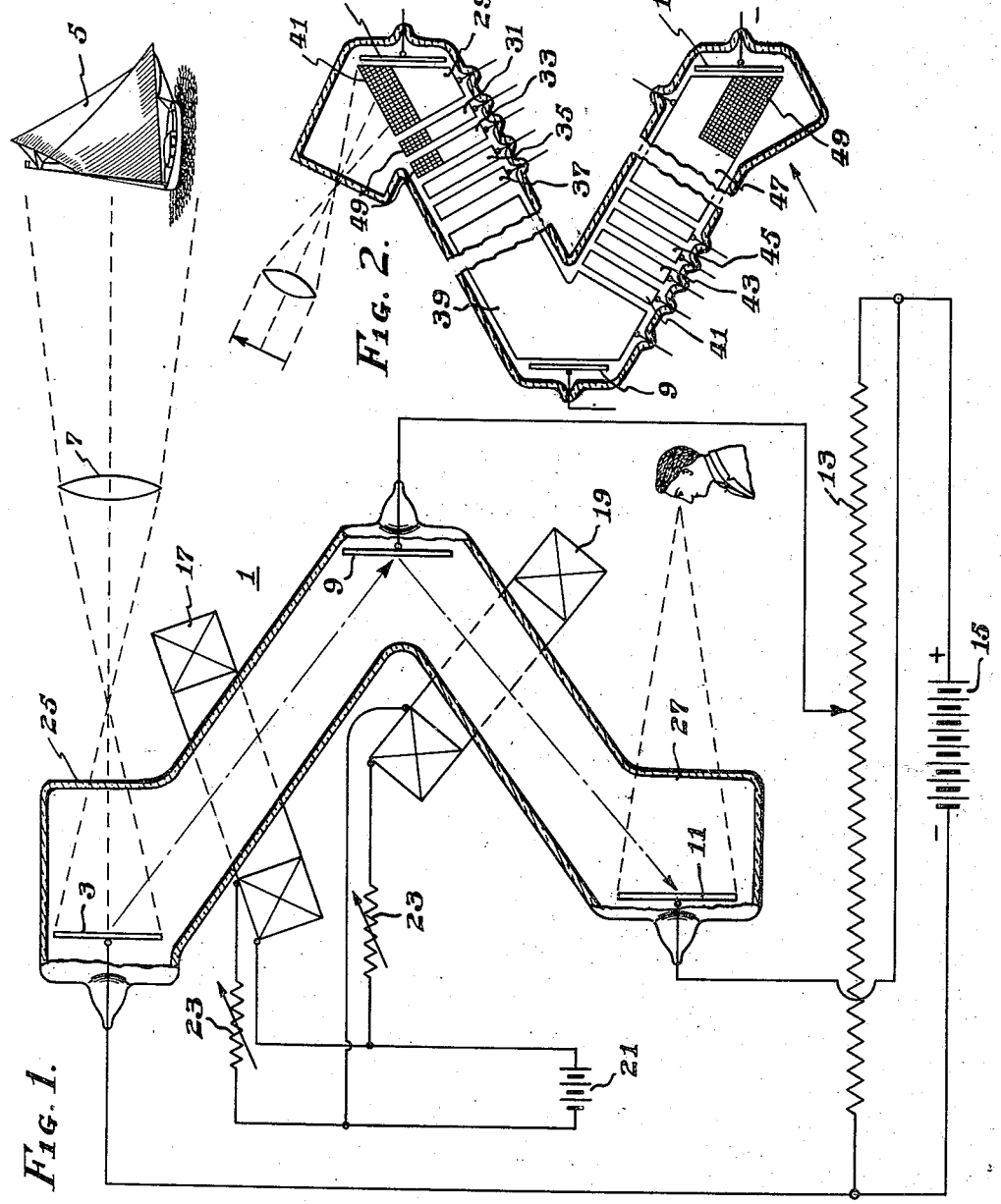
Witness:
George Jepson
INVENTORS
Leslie E. Flory
George A. Morton
BY R. Goldsborough
ATTORNEY

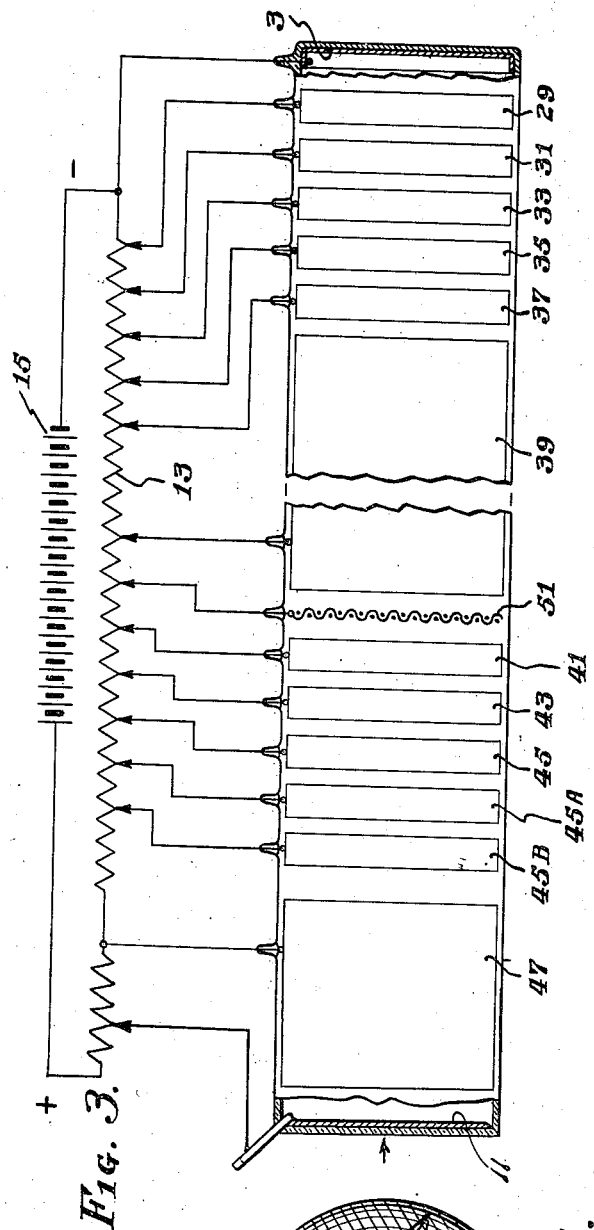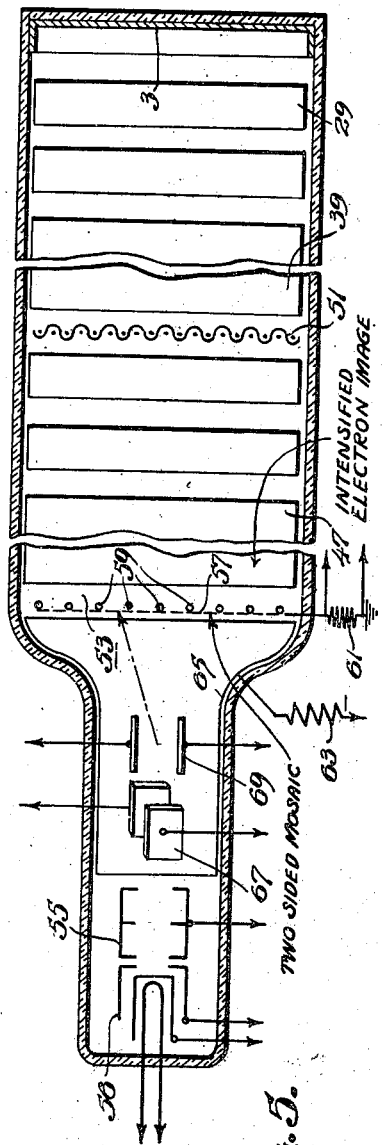

Patented July 15, 1941

2,248,977

UNITED STATES PATENT OFFICE 2,248,977

ELECTRO-OPTICAL DEVICE

Leslie E. Flory, Oaklyn, and George A. Morton, Haddon Heights, N. J., assignors to Radio Corporation of America, a corporation of Delaware Application August 29, 1935, Serial No. 38,380

8 Claims. (Cl. 250—165)

Our invention, broadly considered, relates to electro-optical devices and the like and more especially to devices for intensifying an optical image whereby its visibility is increased or intensifying an electron image.

Heretofore, it has been found desirable to produce electron images of visible or invisible objects for the purpose of television transmission, microscopy, or the like. Insofar as we are aware, however, it has not previously been proposed to intensify the electron image before utilization.

It is, therefore, an object of our invention to provide means for intensifying an electron image.

Another object of our invention is to provide a device that is capable of intensifying a very faint image of an object into a brilliant and plainly visible image.

Another object of our invention is to provide means whereby an image produced by infra red rays, ultra violet rays or other rays emanating from an object may be translated into a visible image.

Another object of our invention is to provide means whereby a totally invisible image of an object may be translated into a visible image thereof.

A still further and more specific object of our invention is to translate a poorly visible or totally invisible image of an object into a greatly enlarged and clearly visible image thereof.

The foregoing objects and other objects ancillary to our invention we accomplish, in short, as follows:

By suitable optical means an image of an object is thrown upon a photosensitive surface thus causing the emission of a "bundle" or "family" of photo-electrons therefrom. The photo-electrons are caused to impinge upon a target capable of emitting a multiplied "family" of secondary electrons and the secondary electrons are caused to fall upon a fluorescent screen. By means of suitable electron focusing devices, either electromagnetic or electrostatic in character, the primary electrons from the photosensitive surface are focused onto the secondary emitter and by analogous focusing devices the secondary electrons may be focused upon a fluorescent screen. Through suitable choice of potentials applied to the several electrodes and to the focusing devices we are able to obtain a greatly magnified visible image of the object or, if desirable, an image smaller than that which is thrown upon the photosensitive surface. Also, through proper choice of photosensitive materials, we are able to render our device sensitive to the entire spectrum including wavelengths longer and shorter than the visible, as well as the visible itself.

The novel features which we consider characteristic of our invention are set forth with particularity in the appended claims. The invention itself, however, both as to its organization and its method of operation, together with additional objects and advantages thereof, will best be understood from the following description of a specific embodiment when read in connection with the accompanying drawings, in which:

Fig. 1 is a view, partly diagrammatic and partly pictorial, of an electronic telescope constructed according to our invention, the same being provided with electromagnetic focusing devices, Fig. 2 is a view of an analogous device wherein the focusing is accomplished through the use of electrostatic means, Fig. 3 is a view, partly sectional and partly diagrammatic, of an alternative embodiment of our invention, Fig. 4 is a view of the end of the device looking in the direction of the arrow shown in Fig. 3, exemplifying the appearance of an intensified image upon the fluorescent screen, and Fig. 5 is a fragmentary view of an alternative embodiment.

Referring now to Fig. 1 of the drawings, our improved electro-optical device is constituted by an evacuated V-shape container 1 in one end of which is disposed a photosensitive electrode 3. An optical image of an object 5 is focused upon the photosensitive electrode by means of a suitable lens system exemplified by the single lens 7 shown in the drawings. Such lens system may be constructed of optical glass, if the device is to be used for intensifying visible images, of quartz, if ultra violet light from an object is to be utilized, or of hard rubber, or the like, if use is to be made of infra red light.

An electrode 9 capable of secondary emission is disposed at the point of the V in such manner that it is exposed to photo-electrons emitted from the photosensitive electrode 3 and a fluorescent screen 11 is disposed in the other end of the container and is accessible to secondary electrons emitted from the intermediate electrode 9.

Preferably, the secondary electron emissive electrode 9 and the fluorescent screen 11 are maintained at positive potentials with respect to the photosensitive electrode 3, as by connecting them to suitable points along a voltage divider 13, the terminals of which, respectively, are connected to any convenient source of potential exemplified in the drawings by a battery 15.

A coil of wire 17 is adjustably disposed around the container between the photosensitive electrode and the secondary emissive electrode and a similar coil 19 is disposed around the container between the secondary emissive electrode and the fluorescent screen. These coils may be supplied in parallel with current from any convenient source, such as a battery 21, and each coil may be provided with an adjustable rheostat 23 or the like for the purpose of controlling the focusing current. Furthermore, the coils may be adjusted both axially and angularly with respect to the container in order to correct for any "keystone" effect occasioned by the fact that the electrons impinge at an angle upon the secondary emissive electrode and upon the fluorescent screen. The coils serve to focus the electrons, both primary and secondary, and to constrain them to move in reasonably parallel paths between the several electrodes for the purpose of securing an undistorted image of a distant object such, for example, as a boat or the like.

If it is desired to obtain a magnified image of the object the strength and direction of the focusing field and the potentials may be adjusted to that end. It is not feasible to give more exact instructions for the operation of the device since the potentials and focusing currents depend upon its geometry.

The electrode 3 on which the image is focused may be photosensitized in any well known manner, using potassium hydride, caesium or other material which emits photo-electrons. Caesium is particularly good if the device is to be used for the observation of an image formed by infra red rays.

The secondary electron emissive electrode 9 may be treated in any known way to increase the ratio of emitted to primary electrons. Certain photosensitive materials, such as caesium or potassium hydride, may be used for this purpose, or any surface which emits electrons when bombarded with cathode rays may be employed.

The fluorescent screen 11 may be constituted by a metallic electrode on which is deposited a layer of willemite or other well known material which fluoresces under electron impact. Obviously, the screen may be placed on the end wall of the tube if desired.

The container 1 itself, of course, may be constructed of opaque non-magnetic material provided windows 25 and 27 are left at each end for the ingress and egress of light, respectively. Furthermore, it is to be understood that the illustration of the focusing coils 17 and 19 is purely diagrammatic, it, of course, being possible to have each coil encompass much more of the tube than is shown.

It is also to be kept in mind that the degree of image intensification depends upon the number of times the electron stream is caused to give rise to secondary electrons. That is, to say, the fluorescent screen 11 can be replaced by a source of secondary electrons and the electrons therefrom, in turn, may be focused upon still another secondary emissive electrode and so on, before the finally amplified electron stream is utilized to produce an image. It would needlessly complicate the drawings, however, to illustrate such an obvious modification.

As hereinbefore stated, it is feasible to utilize electrostatic electron focusing instead of electromagnetic. An alternative modification of our invention wherein focusing is accomplished electrostatically is exemplified by Fig. 2 of the drawings.

Such modification may also be constituted by a V-shape container wherein are disposed a photosensitive electrode 3, a secondary emissive electrode 9 and a fluorescent screen 11, the same as are shown in Fig. 1 of the drawings. Instead, however, of utilizing exteriorly disposed coils for focusing we sequentially interpose a plurality of cylinders 29, 31, 33, 35, 37 and 39 between the photosensitive electrode and the secondary emissive electrode and a plurality of analogous cylinders 41, 43, 45 and 47 between the secondary emissive electrode and the fluorescent screen. If the cylinders between each pair of electrodes are maintained at potentials intermediate the electrode potentials, electron focusing may be had in substantially the same manner as it is had with the device exemplified by Fig. 1. A reasonably wide range of potentials is permissible, keeping in mind, however, the fact that the photo-electrons are to be accelerated toward the secondary emissive electrode and that the secondary electrons are to be removed therefrom and accelerated toward the target. Each pair of cylinders, when proper potentials are applied thereto, forms an electron lens. These cylinders may be discrete metallic structures mounted within the tube or they may be formed by platinizing or otherwise metallizing the inner walls of the tube and thereafter so removing the metal as to leave spaced apart rings thereon. Preferably, the cylinders adjacent the photosensitive electrode and the fluorescent screen have each a foraminous portion for the ingress and egress of light respectively.

We have also found it feasible to dispense with the zig-zag-shaped container and to dispose all of the elements within a single cylindrical evacuated container. This modification is shown in Fig. 3 of the drawings wherein elements analogous to those shown in Fig. 2 are similarly designated. Substantially the only difference between the device shown in Fig. 2 and the one shown in Fig. 3 lies in the construction of the secondary electron emissive electrode which, as will be noted from the drawings, is constructed in the form of a treated screen and in the provision of additional focusing cylinders 45A and 45B. When photo-electrons are accelerated toward and focused upon the screen 51 the secondary electrons emitted thereby are drawn through the screen and accelerated toward the fluorescent screen by reason of the fact that the focusing rings 41 to 47, inclusive, are maintained at successively higher positive potentials than the screen. The focusing and accelerating cylinders within the device may be satisfactorily mounted as shown or they may also be constituted by metallic coatings upon the inner walls of the cylinder, as described in connection with Fig. 2. The fluorescent screen 11, in Fig. 3, may be conductive and may also be provided with an external connection to which a positive potential from the potential divider 13 may be applied. Electrode 3 is semi-transparent.

It will be apparent from the foregoing description of certain devices constructed according to our invention that they find their greatest field of usefulness in rendering visible faint images of objects, either near or distant, which images are substantially invisible to the naked eye or through telescopes of ordinary types. Furthermore, our improved electro-optical device is of great value in connection with navigation since it enables the viewing of distant objects through haze which so scatters blue and ultra violet light as to greatly impair visibility.

Further, in accordance with our invention, the intensified electron image may be utilized for television transmission instead of causing it to fall upon a fluorescent screen. In such case, the fluorescent screen 11 is dispensed with and the image may either be directly scanned, for example as shown in Farnsworth Patent No. 1,773,980, or it may be thrown upon a planar mosaic electrode 53 as shown in Fig. 5 which, in turn, is scanned by a cathode ray from an electron gun comprising a thermionic cathode 55 and a first anode 56 to provide a train of electrical impulses. The mosaic electrode is exemplified, in the drawings, by a reticulated element 57 in each opening of which is disposed a metallic particle 59. The particles are insulated from the reticulated element and are accessible to the intensified electron image on the one side and to the moving cathode ray on the other. The output signal may appear across a resistor 61 connected to the reticulated element or a resistor 63 connected to a metallic coating 65, or the like on the gun side of the screen. The metallic particles 59 may be treated in known ways to enhance secondary emission. The ray-deflecting means may comprise a pair of "horizontal" and a pair of "vertical" deflecting plates, 67 and 69, respectively. The photo-cathode 3, the image-intensifying electrode 51 and the electron lens element 29, 39, 47, etc., are here shown mounted and arranged in the same manner as described in connection with the device of Fig. 3.

Although we have chosen certain representative embodiments of our invention for purposes of explanation, we are aware of other modifications that at once will be apparent to those skilled in the art. Our invention, therefore, is not to be restricted except by the spirit of the appended claims.

We claim as our invention:

1. An image intensifier comprising an evacuated envelope containing an electrode having a secondary electron-emissive surface adapted to release an entire secondary electron image, and a photoelectric image cathode and an image target electrode facing said secondary electron-emissive surface.

2. The invention as set forth in claim 1 and wherein said image target electrode comprises a fluorescent screen.

3. An image intensifier comprising means for forming a primary electron image corresponding to a light image, means for producing an intensified secondary electron image corresponding to said primary electron image, an electrode upon which said intensified secondary electron image is caused to fall, and means for scanning said last-mentioned electrode.

4. The invention as set forth in claim 3 wherein said last-mentioned electrode comprises a mosaic electrode and said scanning means comprises an electron gun.

5. An image intensifier comprising an evacuated envelope containing a photo cathode adapted to release an entire primary electron image in response to the impress thereon of a light image, secondary emitter electrode adapted to release an entire secondary electron image in response to the impress thereon of said primary electron image, a third electrode adapted to respond to the impress thereon of said secondary electron image, a plurality of apertured cylindrical electrodes mounted between said cathode and emitter electrode for focusing said primary electron image from said cathode to said emitter electrode, and a plurality of apertured cylindrical electrodes mounted between said emitter electrode and said third electrode for focusing said secondary electron image from said emitter electrode to said third electrode.

6. The invention as set forth in claim 5 and wherein the space between said cathode and emitter electrode and the space between said emitter electrode and said third electrode is entirely unobstructed.

7. An image intensifier comprising an evacuated envelope containing a photocathode adapted to release an entire primary electron image in response to the impress thereon of a light image, a secondary emitter electrode having a surface adapted to release an entire secondary electron image in response to the impress thereon of said primary electron image, a third electrode adapted to respond to the impress thereon of said secondary electron image, electrostatic means mounted between said photocathode and secondary electron emitter for focusing said primary electron image upon said secondary electron emitter, and electrostatic means mounted between said secondary electron emitter and said third electrode for focusing said secondary electron image upon said third electrode.

8. The invention as set forth in claim 7 and wherein said secondary emitter electrode faces the emissive side of said photocathode and said third electrode faces said emissive surface of said secondary emitter electrode.

LESLIE E. FLORY.
GEORGE A. MORTON.